Figure 4:
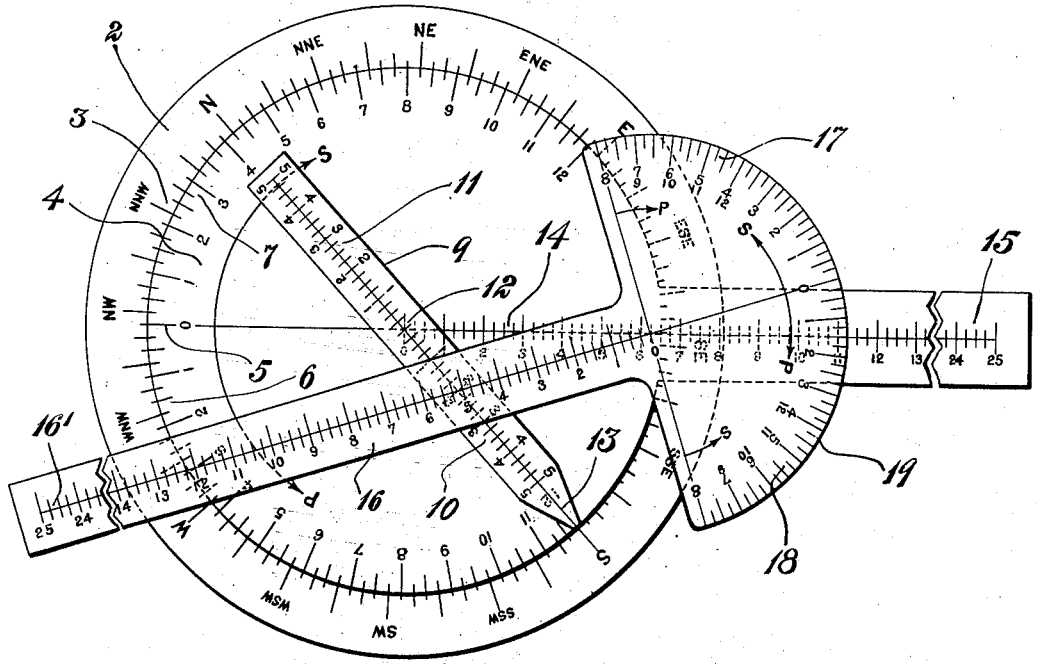

A. E. THAYER.
COURSE FINDING INSTRUMENT.
APPLICATION FILED JULY 30, 1913.
1,113,717.
Patented Oct. 13, 1914.
4 SHEETS—SHEET 1.
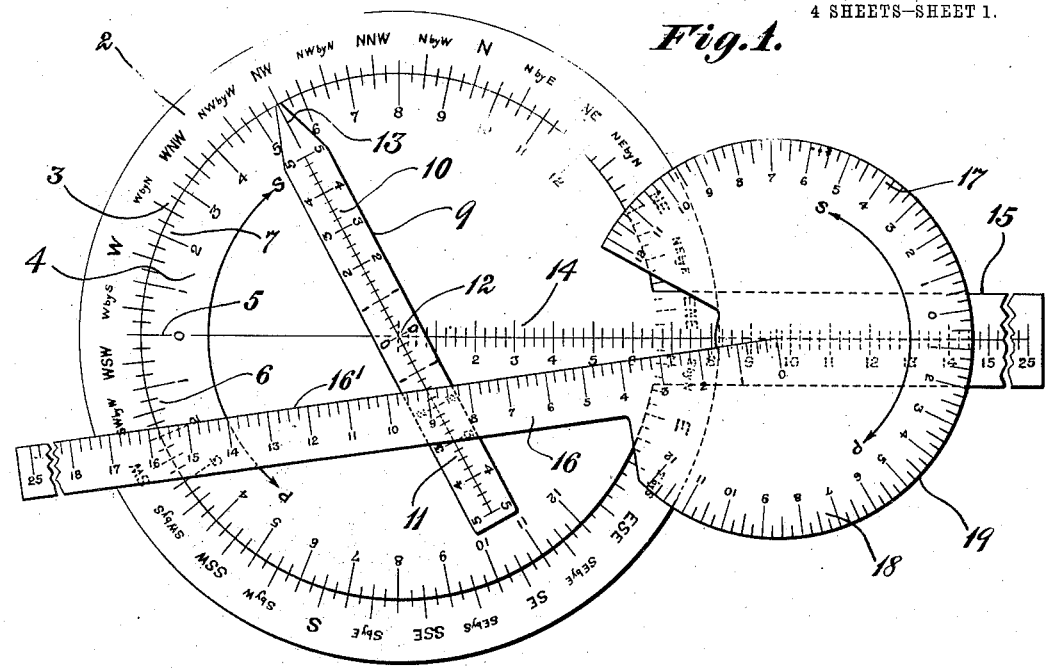
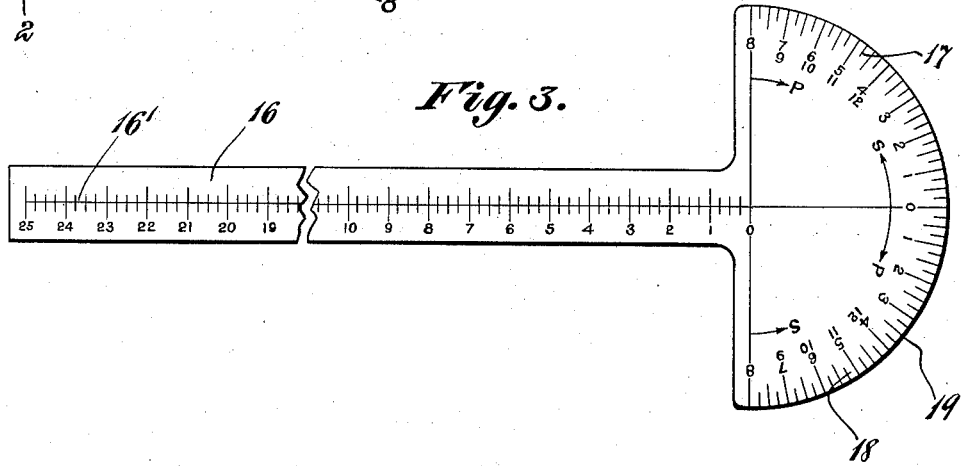
Witnesses:
Gertrude S. Lappen
Inventor:
Arthur E. Thayer
By his Attorneys,
Sutherland & Anderson.

A. E. THAYER.
COURSE FINDING INSTRUMENT.
APPLICATION FILED JULY 30, 1913.

1,113,717.

Patented Oct. 13, 1914.
4 SHEETS—SHEET 2.

Witnesses:

Inventor:
Arthur E. Thayer
By his Attorneys,

A. E. THAYER.
COURSE FINDING INSTRUMENT.
APPLICATION FILED JULY 30, 1913.

1,113,717.

Patented Oct. 13, 1914.
4 SHEETS—SHEET 3.

Witnesses:

Inventor:
Arthur E. Thayer
By his Attorneys,

A. E. THAYER.
COURSE FINDING INSTRUMENT.
APPLICATION FILED JULY 30, 1913.

1,113,717.

Patented Oct. 13, 1914.
4 SHEETS—SHEET 4.

Witnesses:
Gertrude S. Lappen

Inventor:
Arthur E. Thayer
By his Attorneys,
Sutherland & Anderson

UNITED STATES PATENT OFFICE.

ARTHUR E. THAYER, OF WEST HARTFORD, CONNECTICUT.

COURSE-FINDING INSTRUMENT.

1,113,717.

Specification of Letters Patent.

Patented Oct. 13, 1914.

Application filed July 30, 1913. Serial No. 781,966.

*To all whom it may concern:*

Be it known that I, ARTHUR E. THAYER, a citizen of the United States, residing at West Hartford, in the county of Hartford and State of Connecticut, have invented certain new and useful Improvements in Course-Finding Instruments, of which the following is a specification.

This invention relates to what I shall for convenience term a "course-finding instrument."

A device involving my invention can be employed with advantage in many different connections, although it is of peculiar utility when used on shipboard in which event it is adapted to determine different things, for example the steering course of a ship or the sailing course thereof and preferably both. It is possible that if the sailing-course, the speed of a vessel, and the direction and velocity of the tide be known, the resultant speed of the vessel, its course allowance, and its steering course can be found, and it is equally possible that if the steering course, the vessel's speed, and the direction and velocity of the tide be known, the resultant speed of the vessel, the course allowance and the sailing course of the vessel can be determined, but at the present time abstruse and intricate calculations, requiring some time in their working out, are requisite to ascertain these facts. With the aid of the instrument I can practically instantly determine these things. While the instrument is organized for ascertaining both the steering course and the sailing course, there may be instances where it will be adapted merely for determining one of them. For example instead of making one instrument I might make two, one adapted to find the steering course when given other facts, and the other to ascertain the sailing course when given the necessary conditions to find the same.

In the drawings accompanying and forming part of the present specification I have shown in detail several of the many convenient forms of embodiment of the invention which to enable those skilled in the art to practice the same will be set forth fully in the following description. I do not restrict myself to this disclosure; I may depart therefrom in several ways within the scope of the invention defined by the claims following said description.

Figure 5:
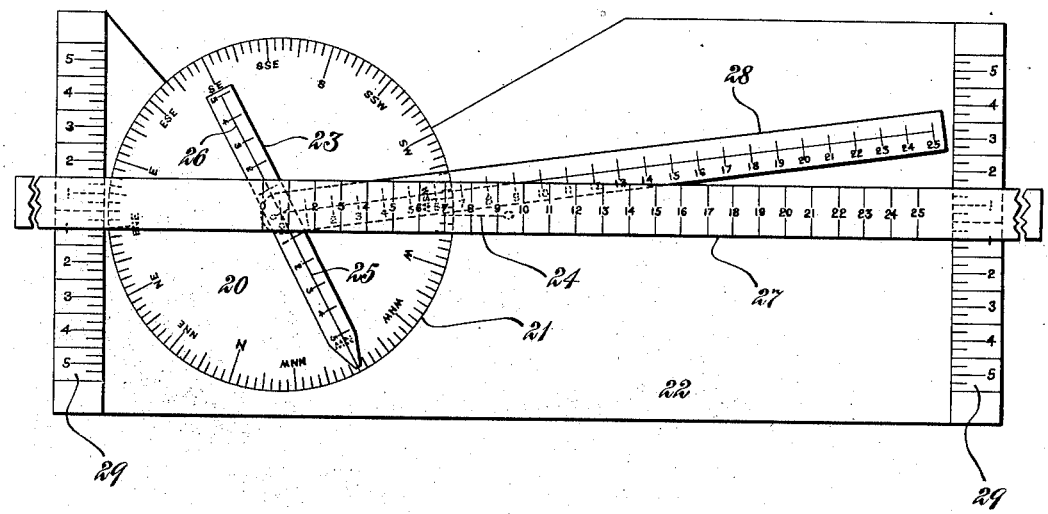
Figure 6:
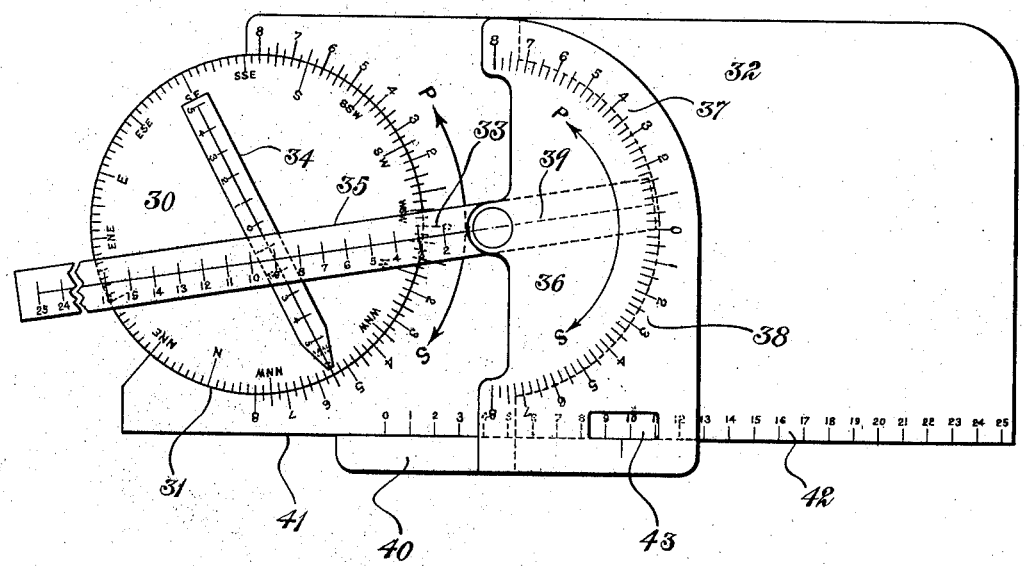
Figure 7:
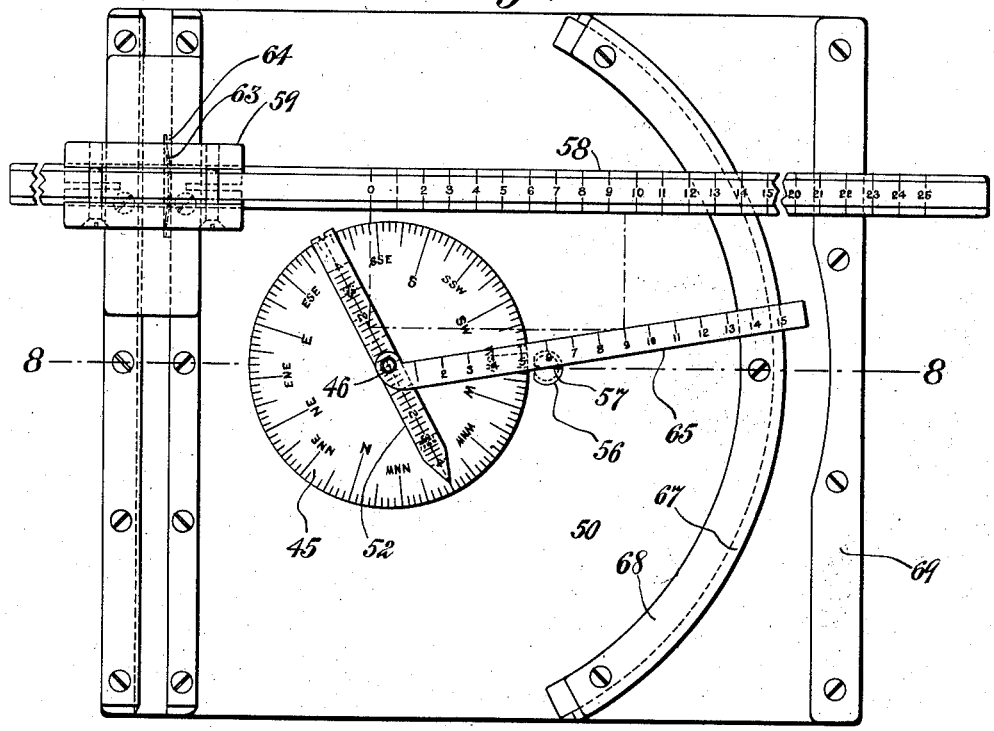
Figure 8:
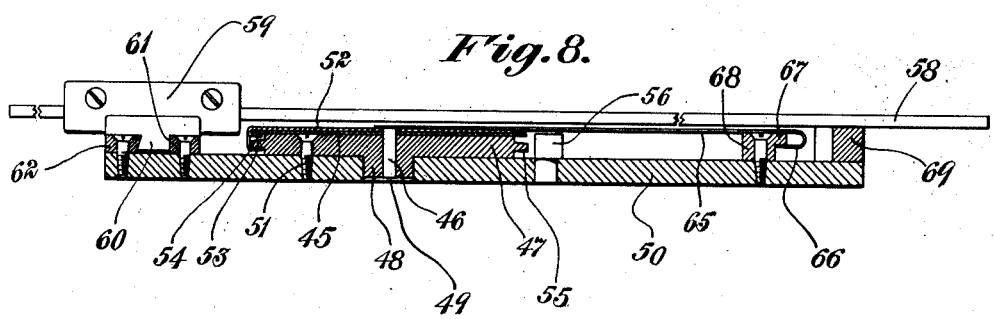

Referring to said drawings: Figure 1 is an elevation of a course-finding instrument involving my invention and showing the same set to ascertain a steering course. Fig. 2 is a side elevation of the same, the intermediate portion thereof being broken away and in section. Fig. 3 is a view of a slightly different form of the loose scale. Fig. 4 is a view corresponding to Fig. 1 and showing the device arranged for finding the sailing course. Figs. 5, 6 and 7 are views corresponding with Figs. 1 and 4, showing different forms of the instrument and in each case the same arranged to ascertain the steering course. Fig. 8 is a longitudinal section on the line 8—8 of Fig. 7.

Like characters refer to like parts throughout the several figures of the drawings.

The course-finding instrument constituting the subject matter of the present case, is susceptible of widely-different uses, although it is of peculiar aid to navigators. I use the terms "ship" and "vessel" herein indiscriminately to include a sailing, steam, power or other craft. As will be inferred from what has already been observed the instrument can be used in two different ways. Paths of vessels are charted. It will be assumed that a vessel should follow a charted path or what might be properly considered a sailing course, the terminals thereof being known. The direction of flow of the tide may be such, however, as to carry the vessel off this sailing course. With the use of the instrument I can determine a steering course which if followed would theoretically or approximately take the vessel along the sailing course. In the other case the vessel's captain may wish for example to take advantage of the wind, and in doing so will follow a steering course, as it might be termed, or the actual path the vessel is steered, which, however, is not the sailing course or the charted path. By the use of the instrument he can determine just how much he is off the charted or sailing course and where his vessel would be at a given time provided the steering course be followed.

The instrument preferably involves in its make-up a compass dial, which may be of any suitable material, such as sheet celluloid, metal, cardboard, paper or it might be a casting, the material and shape not being essential, as when I speak of the part in question as a dial, I do not necessarily mean to imply that it is circular or annular in form, but rather that it is graduated like the face of the dial of the mariner's compass. A dial such as meets the necessary conditions is that designated by 2, and it is provided on its face with the customary radial graduations 3 disposed in annular order. In conjunction with this dial 2 is a member having an indicating portion, said two parts being relatively movable to bring the indicating portion or mark opposite different graduations of the compass dial 2, and such a member as answers my requirements is that designated by 4. Although said part 4 is shown as a disk, this is not in all cases necessary; the part 4 may be also made from any of the sheet materials to which I have already referred, the indicating mark thereof being designated by 5, bearing as a matter of convenience the symbol zero; any other designating character or indicating mark might answer as well. Extending oppositely from the indicating mark 5 are the two arcuate scales 6 and 7, the scale 6 representing port and the scale 7 starboard as indicated in Fig. 1. The two scales 6 and 7, although advantageous, are not always necessary, as their functions may be performed by the graduations of the compass dial as will hereinafter appear. The two disks or dials 2 and 4 are preferably concentric, being pivoted together for relative rotary movement, by the pivot 8.

In conjunction with the two dials or disks 2 and 4 is a manually-adjustable pointer as 9 superimposed upon the upper dial or disk 4 and to which the pivot 8 is connected, so that the pointer 9, also scaled as will hereinafter appear, can turn or swing so that its pointed end can coöperate directly with the graduations 3 of the compass dial. This pointer or index finger 9 has two scales 10 and 11 at opposite sides of the zero or neutral mark 12 thereof, the scale 10 being on what I consider the active or setting end of the pointer 9, while the scale 11 is on the inactive or non-setting end of said pointer, the scale 11 being utilized in ascertaining the steering course while the scale 10 is employed in finding the sailing course. The zero mark common to the two scales 10 and 11 is coincident with the axis of rotation of the swinging pointer 9.

The instrument thus far described is complete in itself as by such an instrument with the aid of suitably graduated devices, I can determine the facts desired by the mariner, but I prefer that these devices be a part of the instrument. To insure greater accuracy the pointing or setting end of the pointer 10 has an indicating line 13 disposed longitudinally centrally thereof to coöperate with the radial graduations 3 of the compass dial. There is also what I term a base scale as 14, this base scale as illustrated extending from the center of the disk or dial 4 diametrically outward from the center thereof and along the radial extension 15 of said dial 4, the zero of said base scale 14 being concentric with the two dials 2 and 3 and the numbers thereof reading upward away from the tide pointer 9. In addition to the base scale 14 there is a loose or movable scale 16; the two scales 14 and 16 and one of the scales of the pointer 9 coöperating when the instrument is used for determining either the sailing or steering course at which time the three scales will be in triangular relation, one leg of the triangle representing the steering course, another leg the sailing course, and the third leg the direction of flow of the tide, the deviation from the course being indicated for example upon one of the arcuate scales 17 and 18 upon the circular head 19 forming a part of the scale 16, the scale 17 being utilized to determine deviations from the desired course, to starboard, while the scale 18 is to determine deviations from said course, to port. The scale 16 with its circular head 19 is preferably transparent, and this can be secured by making the same of celluloid or equivalent material or the said loose or movable scale 16 might be made partly transparent or to an extent sufficient to obtain the necessary readings upon the base scale 14 and upon either of the scales of the pointer 9.

It will be assumed that the navigator knows the sailing course to be W. by S½S., the vessel's speed to be 9 knots, the direction of the tide to be NW. and its velocity 1½ knots. Being given these he wishes to ascertain the resultant speed of the vessel, its course allowance and its steering course. In such event the compass dial and numerical dial 4 are manipulated, so that said sailing course coincides with the zero or indicating line 5 of the numerical dial 4 as illustrated in Fig. 1. The pointer 9 should then be moved to the mark on the compass dial indicating the flow of the tide which as has been already stated is NW. The straight gage portion 16' of the loose scale 16 is then located so that the speed (9 knots) of the vessel, on said loose scale, coincides with the speed of the tide on the non-setting end of the tide scale 11, which as is known is 1½ knots. The zero of the loose scale 16 should at the same time be placed on the gage portion or center line of the base scale 14, all as indicated in Fig. 1. The resultant or actual speed of the vessel along the sailing course will be found on the base scale 14 coinciding with the zero mark of the loose scale being 9⅝ knots. The course allowance will be found on the mark of the port arcuate scale 18, coinciding with the center line of the base scale 14, being ¾ point to port. The steering course will be found on the compass dial coinciding with the mark of the course allowance taken off the port scale 6 of the numerical dial 4 and is SW. by W¼W. As will be understood what is determined by the numerical dial 4 can readily be ascertained by the use of the compass dial, but the presence of the two scales on the numerical dial 4 is of advantage in that reading of the instrument will be facilitated.

In Fig. 4 the parts of the instrument are shown as positioned or adjusted to determine the sailing course or that the vessel will actually follow, the resultant or actual speed of the vessel being also determined. In finding these particulars the steering course, the speed of the vessel and the velocity and direction of the tide are known. The compass dial 2 and numerical dial 4 will be relatively operated so as to bring the steering course coincident with the zero line 5 of the numerical dial 4, and this steering course is assumed to be NW¼W. The pointer 9 is then shifted to bring its indicating line 13 coincident with the graduation of the compass dial 2 conforming with the flow of the tide which is supposed to be S. The loose or movable scale 16 is now set so that the zero end thereof coincides with the speed of the vessel on the base scale 14, said speed being 6¼ knots in the illustrations given. At the same time the straight gage portion 16' of the loose scale is passed through the number of the scale 10 on the setting end of the pointer 9 conforming to the speed of the tide which in the illustration given is 2 knots. With the parts thus placed it will be known that the sailing course is NW. by W¾W. and the resultant speed 5¼ knots. The course allowance is 1½ points to port as found on the scale 18 of the segmental head or section 19.

In Fig. 5 the compass dial is denoted by 20 and in this form of the device there is no numerical dial, the compass dial answering the functions thereof. Said compass dial is mounted for rotation, in the circular opening 21 of the base member 22 and it pivotally carries the pointer 23. On the base member 22 is an indicating line 24 marked for convenience with a zero or any other symbol might answer. In fact it is not necessary to provide a line, as the result in question might be secured in any other suitable way, for example by a notch or an arrow. The pointer has the two scales 25 and 26 on its setting and non-setting ends respectively, the zero mark which is common to the two scales as in the previous construction, being coincident with the center or axis of motion of said pointer 23 and the numbers progressing oppositely from the zero mark toward the ends of the pointer. The base scale is denoted by 27 and the movable scale by 28, the latter being connected pivotally with the pivot of the pointer 23, the two scales 27 and 28 and the two scales 25 and 26 on the pointer 23 and the compass dial, and other parts acting exactly as has been already described. This scale 27 should always occupy a definite relation with respect to the compass dial 20 and base member 22, and it may for this purpose traverse the two end scales 29, the presence of which always insures the positioning of the said scale 27 parallel with the longitudinal axis of the base member 22. In the construction shown in Fig. 5 there is no arcuate scale for determining the deviation in points of the vessel from its course, this fact being indicated by the compass dial 20.

In Fig. 6 the compass dial is designated by 30 and it is set in a circular opening 31 of the base member 32. On the base member 32 is an indicating mark 33 answering the same office as the marks 5 and 24 already described. The pointer 34 is mounted and operated exactly like the pointers 9 and 23 and is furnished with like scales. The loose or movable scale is denoted by 35 and is pivoted between its ends to the gage member 36 having on its upper face two series of graduations 37 and 38 for indicating port and starboard course deviations read with the aid of the longitudinal line 39 of the loose scale 35. Along one edge of the gage member 36 is a guide flange 40 engaging the lower edge 41 of the base member 32. Along this edge 41 is the base scale 42 which can be read through a slot 43 in the gage member 36. In any adjustment of the parts shown in Fig. 6 the pointer 34 and scales 35 and 42 will occupy a triangular relation.

In Figs. 7 and 8 the compass dial is denoted by 45, being pivoted as by the pivot 46 to the disk 47 provided with a central stud 48 fitted in the perforation or hole 49 in the base member 50, one or more screws as 51 being provided to rigidly connect said supporting disk or compass dial carrier 47 with the base member or board 50. The tide pointer is denoted by 52 and is provided with scales exactly the same as those described in connection with the other pointers. The butt portion of the pointer 52 is provided with lugs 53 and 54, the lug 53 being hooked around the periphery of the compass dial 45, while the lug 54 is similarly associated with the annular circumferential flange 55 of the compass dial carrier 47, which provides a simple way of accurately guiding the pointer. On the upper side of the base member 50 is a stud 56 furnished with an indicating mark 57 to coöperate with the graduations of the compass dial 45. The base scale in this construction is designated by 58, and it has fastened to one end thereof as by screws the head 59 provided with a pendent projection 60 disposed between the parallel guide strips 61 and 62 fastened as by screws or otherwise to the base member 50, the engaging faces of the projection 60 and strip 62 being chamfered and the said projection 60 being held in contact with the strip 62 by the bowed spring 63 fitting a recess 64 in said projection and bearing against the strip 61 to thus insure straight motion of the head 59 and therefore parallel movement of the base scale 58. The movable scale is designated by 65 and is connected for swinging movement with the pivot 46 being provided with a hook 66 at its free end to engage the curved flange 67 on the segment 68 fastened as by screwing, to the base member 50, this construction providing a means for accurately guiding the loose or movable scale 65. The parts shown in Figs. 7 and 8 operate exactly as has already been described in connection with the corresponding parts, it being understood that the scale 58 is brought down, in making a calculation, into proper relation with the tide pointer 52, it being shown in its inoperative relation in Fig. 7. The dotted lines, however, in this view show the position the base scale occupies in making a calculation. To prevent the base scale 58 from sagging the support 69 may be provided. In the form of instrument shown in Figs. 7 and 8 course deviations are obtained from the compass dial 45.

What I claim is:

1. An instrument of the class described comprising a compass-dial, a member having an indicating mark, said parts being relatively movable about an axis to bring said indicating mark opposite different graduations of the compass-dial, and a manually settable pointer pivotally mounted for movement about the same axis, said pointer having two series of graduations and being coöperative with the graduations of said compass-dial.

2. An instrument of the class described comprising a compass-dial, and a pointer pivoted concentrically to said compass-dial, manually settable to coöperate with the graduations of said dial, and having two separate scales provided with a common zero mark coincident approximately with the axis of rotation of said pointer and extending oppositely from said zero mark.

3. An instrument of the class described comprising a compass-dial, a member having an indicating mark, said parts being relatively movable about an axis to bring said indicating mark opposite different graduations of the compass-dial, a pointer movable about the same axis, to coöperate with the graduations of the compass-dial, said pointer having two separate scales extending longitudinally thereof in opposite directions, said scales having a common zero substantially coincident with said axis.

4. An instrument of the class described comprising a compass-dial, a member having an indicating mark, said parts being relatively movable about an axis to bring said indicating mark opposite different graduations of the compass-dial, a pointer movable about said axis, to coöperate with the graduations of the compass-dial, having a graduated scale, a base scale and a movable scale, the three scales being adapted to be relatively adjusted into triangular relation with each other and said movable scale having a scale connected therewith, coöperative with said base scale.

5. An instrument of the class described comprising a compass-dial, a member having an indicating mark, said parts being relatively movable about an axis to bring said indicating mark opposite different graduations of the compass-dial, a pointer movable about said axis, to coöperate with the graduations of the compass-dial, having a graduated scale, a base scale and a movable scale, the three scales being adapted to be relatively adjusted into triangular relation with each other, and a graduated arcuate scale connected with said movable scale.

6. An instrument of the class described comprising a compass-dial, a member having an indicating mark, said parts being relatively movable to bring said indicating mark opposite different graduations of the compass-dial, a pointer movable about said axis to coöperate with the graduations of the compass-dial, having two graduated scales extending oppositely from a zero mark approximately coincident with said zero mark, a base scale, and a loose scale, said base and loose scales and either of the scales of the pointer being adapted to be relatively adjusted into triangular relation with each other.

In testimony whereof I affix my signature in presence of two witnesses.

ARTHUR E. THAYER.

Witnesses:
HEATH SUTHERLAND,
JAMES H. KEANE.